Patented July 28, 1953

2,647,098

UNITED STATES PATENT OFFICE 2,647,098

LINEAR POLYESTER PLASTICIZERS

William Mayo Smith, Jr., Cuyahoga Falls, and Robert J. Reid, Canal Fulton, Ohio, assignors to The Firestone Tire & Rubber Company, Akron, Ohio, a corporation of Ohio No Drawing. Application November 8, 1951,
Serial No. 255,540

15 Claims. (Cl. 260—31.4)

This invention relates to certain subresinous linear polyester plasticizers for vinyl chloride resins, and more particularly to the improvement of the heat-ageing behavior of these plasticizers when compounded with the resins.

It has been discovered by associates of the present applicants that certain subresinous linear polyesters of (A) an alkylene dicarboxylic acid with (B) a glycol and (C) a monohydric alcohol provide excellent plasticizers for vinyl chloride resins. Hereinafter these materials will be referred to as "linear polyesters." These linear polyesters have excellent efficiency as plasticizers, are not susceptible to excessive migration, and impart excellent low temperature properties to the resins in which they are incorporated. Such linear polyesters may be prepared in one of two ways—(1) by transesterification of an ester of the dicarboxylic acid with the glycol, or (2) by direct esterification of the free acid with the glycol and alcohol. Method (2) is by far the less expensive; unfortunately vinyl chloride resins containing polyesters produced by method (2) exhibit relatively poorer heat ageing than resins containing the polyesters produced by method (1).

Accordingly, it is an object of this invention to provide novel plasticized vinyl chloride resin compositions.

Another object is to provide such resins in which the plasticizer is a subresinous linear polyester.

Still another object is to provide subresinous linear polyester plasticizers which will impart good heat ageing properties to the vinyl chloride resins into which they are incorporated.

A still further object is to provide a process for treating subresinous linear polyesters to improve the heat ageing properties of the vinyl chloride resins into which they are incorporated.

SYNOPSIS OF THE INVENTION

The above and other objects are secured, in accordance with this invention, by contacting with calcium oxide, at temperatures in the range 125–250° C., for at least 15 minutes, a subresinous linear polyester produced by the direct esterification of a dicarboxylic acid with a glycol and with a monohydric alcohol. Linear polyesters so treated provide excellent plasticizing action in vinyl chloride resins into which they are incorporated, and likewise the compounded resins exhibit greatly enhanced resistance to heat ageing as compared with resins compounded with linear polyesters not treated by the process of this invention.

THE SUBRESINOUS LINEAR POLYESTERS

These are moderately high molecular weight, but subresinous linear polyesters produced by condensing, under esterifying conditions:

|  | Moles |
|---|---|
| (A) A free alkylene dicarboxylic acid containing from 4 to 12 carbon atoms | 2 |
| (B) A glycol or diglycol containing from 2 to 12 carbon atoms and | 1 |
| (C) An aliphatic or alkoxyaliphatic monohydric alcohol containing from 4 to 12 carbon atoms | 2 |

The molecular proportions in the above schedule may be varied by about ±0.1 mole in each case. If the reaction led to a single molecular species, that species would have the formula:

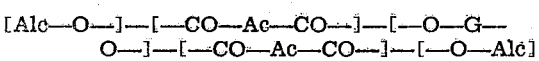

wherein

Alc—O— represents a monohydric alcohol residue

—CO—Ac—CO— represents a dicarboxylic acid residue and

—O—G— represents a glycol residue.

As a matter of fact, a wide variety of molecular species will be obtained, some with a large number of repeating units in the chain, and some with few, tending, as the esterification conditions are prolonged, to a thermodynamically predetermined distribution. These polyesters are generally of a viscosity approximately that of glycerine, and may be characterized as of moderately high molecular weight but of subresinous character.

The acids which may be employed in the preparation of the esters may be any alkylene dicarboxylic acids containing from 4 to 12 carbon atoms, for example:

Table I

Succinic acid
Glutaric acid
Adipic acid
Pimaric acid
Sebacic acid
Azelaic acid

Suberic acid
Undecanedicarboxylic acid
Dodecanedicarboxylic acid

The glycols and diglycols which may be employed may be any such compounds containing from 2 to 12 carbon atoms, for example:

Table II

Ethylene glycol
1,2-propanediol
1,4-butanediol
Hexamethylene glycol
Diethylene glycol
2-methyl-2,4-pentanediol
p-Xylene glycol
2,2'-dihydroxy dipropyl ether
1,5-pentanediol
1,10-decanediol
2-ethyl pentanediol-1,3
Butanediol-1,3
2-ethyl hexanediol-1,3

The monohydric alcohol entering into the synthesis of the esters may be any aliphatic or alkoxyaliphatic alcohol containing from 4 to 12 carbon atoms such as:

Table III n-Butanol
2-ethyl hexanol
2-butoxy ethanol
n-Hexanol
3-ethyl hexanol
Capryl alcohol
n-Octanol
Dodecyl alcohol
The alcohols derived from the "Oxo" process, i. e. hydrogenation of a mixture of carbon monoxide and olefines. Largely 3,5,5-trimethyl hexanol.

The esterification of the acid, glycol and alcohol may be effected under any usual esterification conditions, typically by refluxing in a water-entraining solvent such as toluene. The water evolved is mechanically separated from the refluxing toluene before the latter is returned to the reaction mass. When water ceases to be evolved at an appreciable rate, the reaction mass is heated under reduced pressure to remove the solvent and remaining water and to drive the reaction further to completion.

THE TREATMENT WITH CALCIUM OXIDE

The linear polyesters prepared as described above, even without the treatment of this invention, serve excellently in most respects as plasticizers in vinyl chloride resins, having good "efficiency" (i. e. plasticizing effect per unit quantity of plasticizer employed) and freedom from spew, and imparting particularly good low temperature flexibility to vinyl chloride resins. Likewise the compositions containing these polyesters have excellent light stability. They have, however, the drawback that the resin compounds containing them stiffen and darken upon prolonged exposure to heat, as in milling, extrusion, calendering, molding etc. After heating in contact with calcium oxide in accordance with this invention, however, the linear polyesters no longer have this disadvantage. In general, the heating should be carried out at a temperature of at least 150° C., and preferably at least 175° C., the maximum temperature being that at which the ester decomposes, say 250° C. A time of heating of at least 15 minutes, preferably at least 30 minutes, should be employed, the maximum time being solely a matter of economy of equipment, as there does not seem to be any technical reason why heating should not be continued indefinitely. No substantial improvement will be noted beyond 3 hours' heating. The amount of calcium oxide present is of minor importance; generally ½%, based on the weight of linear polyester being treated, will be operative to effect a substantial improvement of the ester. Greater quantities, on the order of 2% or 3%, will generally be preferable. Since the calcium oxide constitutes a separate phase there would be no theoretical upper limit to the quantity used. As a practical matter, entrapment and loss of the polyester in the calcium oxide at the conclusion of the treatment begins to be uneconomic when quantities as great as 10% are used. The calcium oxide should, of course, be in finely divided or pulverulent form to facilitate access of the polyester to the calcium oxide. The mass undergoing treatment may be agitated to ensure circulation and contact of the linear polyester and calcium oxide. The calcium oxide is separated from the polyester at the conclusion of the treatment by filtration, decantation, centrifugation or like mechanical means.

The linear polyesters are generally incorporated in the vinyl chloride resins to the extent of from about 10% to 60%, based on the weight of the resins.

THE VINYL CHLORIDE RESINS

The vinyl chloride resins which may be plasticized by the linear polyesters treated in accordance with this invention are a well-known class of materials consisting of simple polymers of vinyl chloride, and copolymers of vinyl chloride in which the essential polyvinyl chloride polymer chains are interspersed at intervals with the residues of other monoethylenically unsaturated compounds or conjugated diethylenically unsaturated compounds. In general, any resin having a substantial proportion of the polyvinyl chloride chain structure, so as to be susceptible to heat degradation by mechanisms involving the polyvinyl chloride chain, will be benefited by the addition of the stabilized polyesters treated in accordance with this invention. This will include any vinyl chloride copolymers containing not more than 40%, based on the total weight of the resins, of these extraneous unsaturated compounds. Conversely stated, the resins must contain at least 60% of vinyl chloride copolymerized therein. Suitable compounds for copolymerization with vinyl chloride include, for instance, vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to copolymerize with vinyl chloride, reference may be had to Krczil, "Kurzes Handbuch der Polymerisations-Technik—II, Mehrstoff Polymerization," Edwards Bros. Inc., 1945, pp. 735–747, the items under "Vinyl chlorid." As a rough rule, the criterion of a practical comonomer for use with vinyl chloride to produce copolymers containing 60% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$"

values, as described in J. Polymer Science 2:101, correlated as follows, assuming for vinyl chloride $Q_{vinyl\ chloride} = .03$ and $e_{vinyl\ chloride} = .3$:

$$4.1 > \frac{\frac{.029 e^{-.3(.3-e_2)}}{Q_2}+.04}{1.33 Q_2 e^{e_2(.3-e_2)}+.96} > .37$$

Instead of the single unsaturated comonomers of the types above indicated, mixtures of such comonomers may enter into the copolymers, it being understood that the total quantity thereof shall be small enough (i. e., not over 40%, based on the weight of copolymer) that the essential character of the polyvinyl chloride chain is retained.

With the foregoing general discussion in mind, there are given herewith detailed examples of the practice of this invention. All parts given are by weight.

EXAMPLE

A. *Preparation of the linear polyesters*

|  | grams | moles |
|---|---|---|
| Adipic acid | 2,923 | 20 |
| 1, 4-Butanediol or Diethylene glycol (Per Table IV) | 1,000 or 1,061 (respectively) | 10 |
| "Oxo" Nonyl Alcohols (Mixture of alcohols, containing about 97.5% by weight of 3,5,5-trimethyl hexanol; produced by hydrogenation of petroleum hexene in the presence of carbon monoxide. Marketed by E. I. du Pont de Nemours and Co. as nonyl alcohols) | 2,885 | 20 |
| Toluene | 433 |  |

Linear polyesters were prepared in separate runs from reactants as set forth in the above recipe. The reactants for the particular ester under preparation were charged into a reaction vessel provided with a reflux condenser having a water trap to divert the water from toluene before refluxing the latter to the reaction flask. The reactants were heated and refluxed in the vessel for 24 hours, at the end of which time no substantial further amounts of water were being given off. The water recovered from the trap amounted to about 98% of theory at the end of this time. The pressure in the vessel was then reduced to 50 mm. with continual increase in temperature to 200° C. at which temperature the pressure was reduced to 1-2 mm. In these latter stages of low pressure distillation, all condensate was diverted, rather than refluxed, so as to remove any volatile material from the charge. The product was then cooled and portions thereof treated under various conditions as indicated in Table IV.

B. *Treatment with CaO*

|  | Parts |
|---|---|
| Linear polyester being treated (per Table IV) | 100 |
| Calcium oxide (finely powdered, reagent grade) | 1–10 |

A series of treatments of separate portions of the linear polyesters prepared as described above was carried out, using various esters, temperatures, times of treatment, etc. for the individual runs as indicated in Table IV. In each case the selected linear polyester, with the selected proportion of calcium oxide, were stirred together in a flask and heated for the time indicated in Table IV. At the end of the heating period, the mixture was cooled, and filtered to remove the calcium oxide. In some cases of highly viscous products, the filtration was carried out at higher temperatures, and/or with addition of solvents such as toluene.

C. *Testing*

|  | Parts |
|---|---|
| Polyvinyl chloride (prepared in granular suspension in water) | 100 |
| Linear polyester under test | 50 |
| Calcium stearate | 0.5 |
| Tricalcium phosphate | 1.0 |
| Silicate filler | 1.5 |
| Cadmium lauryl mercaptide | 2.0 |

A series of tests was made, using various linear polyesters in formulations in accordance with the above recipe. In each case, the materials were compounded on a roll mill, and then sheeted off at a thickness of .025 inch. A strip of the sheet was then hung in an oven at 170° C. for two hours, removed, and subjectively rated by the operator as to extent of deterioration. The results are set out in Table IV.

Table IV

| Ingredients of Linear Polyester | CaO Treatment | | | | Item No. |
|---|---|---|---|---|---|
|  | Temperature (° C.) | Time, Minutes | Parts CaO per 100 parts polyester | Appearance of Sheet After 2 Hours at 170° C. |  |
| Adipic Acid, 1,4 - Butanediol and "Oxo" Nonyl Alcohol |  | no treatment |  | dark brown | 1 |
|  | 100 | 900 | 10 | do | 2 |
|  | 150 | 210 | 2.5 | pale amber | 3 |
|  |  |  | 10 | do | 4 |
|  | 175 | 900 | 10 | white | 5 |
| Adipic Acid, Diethylene Glycol and "Oxo" Nonyl Alcohol |  | no treatment |  | brownish black | 6 |
|  | 85 | 195 | 2.5 | brown | 7 |
|  | 135 | 70 | 2.5 | dark brown | 8 |
|  | 150 | 60 | 2.5 | straw | 9 |
|  |  | 90 | 2.5 | do | 10 |
|  |  | 120 | 2.5 | do | 11 |
|  |  | 135 | 2.5 | light amber | 12 |
|  |  | 150 | 2.5 | pale straw | 13 |
|  |  | 180 | 2.5 | do | 14 |
|  |  | 210 | 2.5 | dark brown | 15 |
|  |  |  | 10 | light straw, speckled | 16 |
|  |  | 255 | 2.5 | do | 17 |
|  | 180 | 120 | 2.5 | light tan, speckled | 18 |
|  |  | 30 | 2.5 | Straw, speckled | 19 |
|  |  | 60 | 2.5 | do | 20 |
|  | 200 | 105 | 2.5 | pale straw | 21 |
|  |  | 120 | 2.5 | straw specks | 22 |
|  |  | 180 | 2.5 | straw | 23 |

From the foregoing general description and detailed specific example, it will be evident that this invention provides novel treated linear polyesters which impart excellent heat-ageing properties to vinyl chloride resins into which they may be incorporated. The treated polyesters have all of the excellent plasticising properties characteristic of the untreated polyesters. The process may be carried out by means of relatively simple and inexpensive equipment and with a minimum of technical supervision.

What is claimed is:

1. Process which comprises contacting, with calcium oxide, at temperatures from 150° to 250° C., and for a time of at least 15 minutes, a mixture of linear polyesters produced by esterifying together

|   | Moles |
|---|---|
| A free alkylene dicarboxylic acid containing 4–12 carbon atoms | 2 |
| A diol selected from the group consisting of alkylene glycols and diglycols containing 2–12 carbon atoms | 1±0.1 |
| A monohydric alcohol selected from the group consisting of alkanols and alkoxyalkanols containing from 4–12 carbon atoms | 2±0.1 | the calcium oxide being present to the extent of at least 0.5%, based on the weight of the linear polyesters.

2. Process which comprises contacting, with calcium oxide, at temperatures from 150° to 250° C., and for a time of at least 15 minutes, a mixture of linear polyesters produced by esterifying together.

|   | Moles |
|---|---|
| A free alkylene dicarboxylic acid containing 4–12 carbon atoms | 2 |
| A diol selected from the group consisting of alkylene glycols and diglycols containing 2–12 carbon atoms | 1±0.1 |
| A monohydric alcohol selected from the group consisting of alkanols and alkoxyalkanols containing 4–12 carbon atoms | 2±0.1 | the calcium oxide being present to the extent of at least 2–10%, based on the weight of the linear polyesters.

3. Process which comprises contacting, with calcium oxide, at temperatures from 175° C. to 250° C., and for a time of at least 15 minutes, a mixture of linear polyesters produced by esterifying together

|   | Moles |
|---|---|
| A free alkylene dicarboxylic acid containing 4–12 carbon atoms | 2 |
| A diol selected from the group consisting of alkylene glycols and diglycols containing 2–12 carbon atoms | 1±0.1 |
| A monohydric alcohol selected from the group consisting of alkanols and alkoxyalkanols containing 4–12 carbon atoms | 2±0.1 | the calcium oxide being present to the extent of at least 0.5%, based on the weight of the linear polyesters.

4. Process which comprises contacting, with calcium oxide, at temperatures from 175° to 250° C., and for a time of at least 15 minutes, a mixture of linear polyesters produced by esterifying together

|   | Moles |
|---|---|
| Adipic acid | 2 |
| 1,4-butanediol | 1±0.1 |
| The alcohols produced by hydrogenation of petroleum hexene in the presence of carbon monoxide | 2±0.1 | the calcium oxide being present to the extent of at least 2–10% based on the weight of the linear polyester.

5. Process which comprises contacting, with calcium oxide, at temperatures from 175° to 250° C., and for a time of at least 15 minutes, a mixture of linear polyesters produced by esterifying together

|   | Moles |
|---|---|
| Adipic acid | 2 |
| Diethylene glycol | 1±0.1 |
| The alcohols produced by hydrogenation of petroleum hexene in the presence of carbon monoxide | 2±0.1 |

6. The stabilized polyesters produced by the process of claim 1.

7. The stabilized polyesters produced by the process of claim 2.

8. The stabilized polyesters produced by the process of claim 3.

9. The stabilized polyesters produced by the process of claim 4.

10. The stabilized polyesters produced by the process of claim 5.

11. A heat-stable, plasticized composition comprising a vinyl chloride resin and the stabilized polyesters produced by the process of claim 1.

12. A heat-stable, plasticized composition comprising a vinyl chloride resin and the stabilized polyesters produced by the process of claim 2.

13. A heat-stable, plasticized composition comprising a vinyl chloride resin and the stabilized polyesters produced by the process of claim 3.

14. A heat-stable, plasticized composition comprising a vinyl chloride resin and the stabilized polyesters produced by the process of claim 4.

15. A heat-stable, plasticized composition comprising a vinyl chloride resin and the stabilized polyesters produced by the process of claim 5.

W. MAYO SMITH, Jr.
ROBERT J. REID.

No references cited.